(12) United States Patent
Anderson et al.

(10) Patent No.: US 7,447,993 B2
(45) Date of Patent: Nov. 4, 2008

(54) SYSTEM AND METHOD FOR DISPLAYING A USER INTERFACE OBJECT USING AN ASSOCIATED STYLE

(75) Inventors: Christopher Lee Anderson, Redmond, WA (US); Jeffrey Lawrence Bogdan, Bellevue, WA (US); Namita Gupta, Seattle, WA (US); Michael John Hillberg, Beaux Arts Village, WA (US); Alex Mogilevsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 10/964,174

(22) Filed: Oct. 12, 2004

(65) Prior Publication Data

US 2006/0085745 A1    Apr. 20, 2006

(51) Int. Cl.
  *G06N 3/00*   (2006.01)
(52) U.S. Cl. .................................................. 715/243
(58) Field of Classification Search ................. 715/513, 715/514, 517, 523, 530, 234, 255, 243, 254
  See application file for complete search history.

(56) References Cited

U.S. PATENT DOCUMENTS

| | | | | |
|---|---|---|---|---|
| 6,006,242 A * | 12/1999 | Poole et al. ................. | 715/531 |
| 6,101,513 A * | 8/2000 | Shakib et al. ............... | 715/527 |
| 6,148,311 A * | 11/2000 | Wishnie et al. ............. | 715/513 |
| 6,249,794 B1 * | 6/2001 | Raman ........................ | 715/500 |
| 6,263,332 B1 * | 7/2001 | Nasr et al. ...................... | 707/5 |
| 6,336,124 B1 * | 1/2002 | Alam et al. .................. | 715/523 |
| 6,438,540 B2 * | 8/2002 | Nasr et al. ...................... | 707/3 |
| 6,453,328 B1 * | 9/2002 | Schaeffer et al. ............ | 715/515 |
| 6,463,440 B1 * | 10/2002 | Hind et al. .................. | 707/102 |
| 6,487,566 B1 * | 11/2002 | Sundaresan .................. | 715/513 |
| 6,507,857 B1 * | 1/2003 | Yalcinalp ..................... | 715/513 |
| 6,519,617 B1 * | 2/2003 | Wanderski et al. .......... | 715/513 |
| 6,732,109 B2 * | 5/2004 | Lindberg et al. ............ | 707/101 |
| 7,107,521 B2 * | 9/2006 | Santos ......................... | 715/513 |
| 2004/0104946 A1 * | 6/2004 | Li ............................... | 345/853 |
| 2004/0181665 A1 * | 9/2004 | Houser ........................ | 713/158 |

* cited by examiner

*Primary Examiner*—Stephen S Hong
*Assistant Examiner*—Kyle Stork
(74) *Attorney, Agent, or Firm*—Workman Nydegger

(57) ABSTRACT

An improved system and method for displaying a user interface object using an associated style is provided. To this end, an application may include style declarations that may associate a style resource with a user interface object. The style resource may define property values that may be selectively applied to a user interface object, may specify a visual representation for the user interface object, such as a visual subtree, and may specify additional property values to be conditionally applied to a user interface object. A styling engine may be provided for applying a style resource to a user interface object. A visual representation of the user interface objects with the applied property values may be generated and then a display representation may be rendered for presentation on a user interface display.

38 Claims, 8 Drawing Sheets

```
402 — <FlowPanel>
404 —   <FlowPanel.Resources>
406 —     <Style>
408 —       <Button Background="Red" />
410 —     </Style>
412 —     <Style def:Name="BlueButtonStyle">
414 —       <Button Background="Blue" />
416 —     </Style>
418 —   </FlowPanel.Resources>
420 —   <Button Content="OK" />
422 —   <Button Style="{BlueButtonStyle}" Content="Content" />
424 — </FlowPanel>

426 — <Style>
428 —   <Button Fontsize="12" />
430 —   <Style.VisualTree>
432 —     <Border Background="*Alias(Target=Background)" def:StyleID="Filler"
434 —       Border Thickness="*Alias(Target=Border Thickness)">
436 —       <Text TextContent="*Alias(Target=Content)" />
438 —     </Border>
440 —   </Style.VisualTree>
442 —   <Style.VisualTriggers>
444 —     <PropertyTrigger Property="IsPressed" Value="True">
446 —       <Set PropertyPath="Background" Target:"Filter" Value="Goldenrod" />
448 —       <Set PropertyPath="FontStyle" Value="Italic" />
450 —     </PropertyTrigger>
452 —   </Style.VisualTriggers>
454 — </Style>

456 — <Style def:Name="ButtonStyle">
458 —   <Button Background="Red" />
460 — </Style>
462 — <Style BasedOn="{ButtonStyle}" def:Name="OtherButtonStyle">
464 —   <Button Fontsize="12" Foreground="Yellow" />
466 — </Style>
```

*FIG. 4*

SYSTEM AND METHOD FOR DISPLAYING A USER INTERFACE OBJECT USING AN ASSOCIATED STYLE

FIELD OF THE INVENTION

The invention relates generally to computer systems, and more particularly to an improved system and method for displaying a user interface object using an associated style.

BACKGROUND OF THE INVENTION

When creating a computer application, a developer typically may chose a particular environment, or platform on which the application will ultimately be executed. For example, when writing an application, the developer may choose to develop the application to run on the Microsoft Windows® platform. As a result, the program developer may have different options available for defining how user interface objects will look during interactions with a user of the application.

An application developer may program the application with user interface elements provided by the platform or may create customized user interface elements by defining aspects of their appearance such as background color, font size, border thickness, and so forth, so that the chosen platform may render the display as intended by the application developer. Although functional, this process suffers certain drawbacks. For instance, in order to customize a user interface object for a particular system, a developer may be required to explicitly specify the property values for how each user interface object will be displayed. This may become a cumbersome and repetitive process since the customized style may only apply to one user interface object and the process of customizing the style for other user interface objects may need to be repeated for each user interface object.

What is needed is a way for an application developer to customize the style of any type of user interface object and more easily define how the user interface object will look during interactions with a user of the application. Moreover, such a system and method should allow a developer to define a customized style for displaying a user interface element only once so that the customized style may also be used for displaying other user interface objects.

SUMMARY OF THE INVENTION

Briefly, the present invention provides an improved system and method for displaying a user interface object using an associated style. To this end, an application may include style declarations that may associate a style resource with a user interface object. The style resource may define property values that may be selectively applied to a user interface object, may specify a visual representation for the user interface object, such as a visual subtree, and may specify additional property values to be conditionally applied to a user interface object. A styling engine may be provided for applying a style resource to a user interface object. Furthermore, a property engine may be provided for locating property values, a databinding engine may be provided for binding properties of the user interface elements with properties on data objects, and a tree assembler may be provided for generating a visual representation of user interface objects with the applied property values of a style resources. Finally, a rendering engine may be provided for rendering a display representation of the visual representation for presentation on a user interface display.

The present invention also provides methods for displaying a user interface object using an associated style. When a request is received to display user interface objects, style resources associated with the user interface objects may be located and property values of the style resources may be applied to the user interface objects. In applying the style resources, a visual representation of the user interface objects with the applied property values may be generated. A display representation may then be rendered for presentation on a user interface display. Upon occurrence of a condition specified by an applied style resource, additional property values may be applied to a user interface object. The visual representation of the user interface objects with the additional property values applied may be generated and a display representation may then be rendered for presentation on a user interface display. When the condition is no longer satisfied, the prior property values may be automatically restored, the visual representation of the user interface objects may be generated and a display representation may be rendered for presentation on a user interface display.

Advantageously, the present invention may associate shared style resources with several user interface objects for display. By sharing the style information, an application developer need only define the style once. Upon defining the style, the developer may declaratively associate any number of user interface elements with the defined style.

Other advantages will become apparent from the following detailed description when taken in conjunction with the drawings, in which:

BRIEF DESCRIPTION OF THE DRAWINGS

FIG. 4 is an illustration generally representing exemplary markup language for defining a style and associating the defined style with a user interface element, in accordance with an aspect of the present invention;

DETAILED DESCRIPTION

Exemplary Operating Environment

Figure 1:
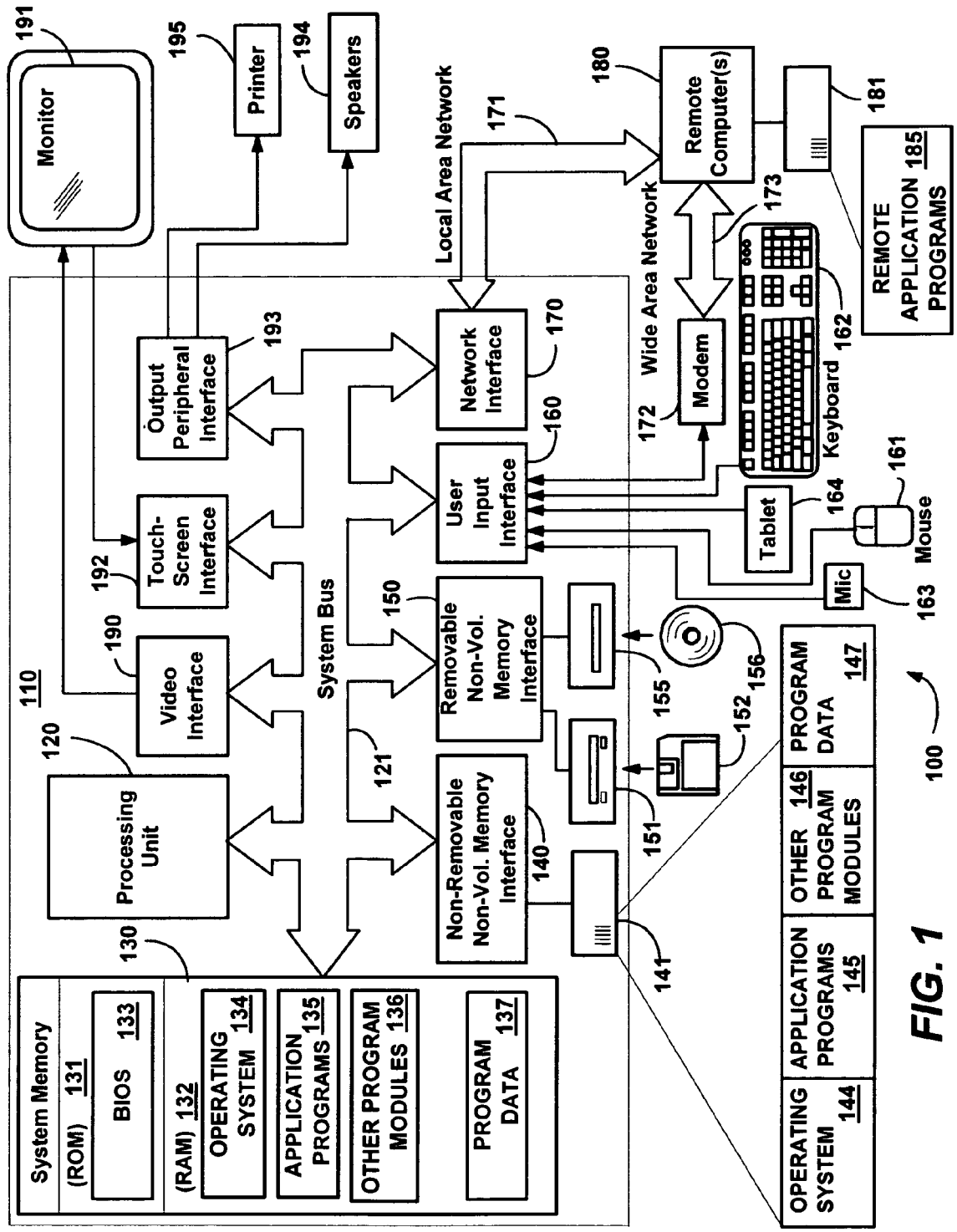
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Displaying a User Interface Element Using an Associated Style

The present invention is generally directed towards a system and method for displaying a user interface object using an associated style. In particular, the present invention relates to associating a shared set of style information with two or more user interface elements that are to be displayed. By sharing the style information, i.e., information defining characteristics of the visual display representation, a program developer may only need to define the style once. Upon defining the style, the developer may declaratively associate user interface elements with the defined style for displaying the user interface elements using the associated style. As will be seen, the architecture of the present invention may be used for development of many different applications. As will be understood, the various block diagrams, flow charts and scenarios described herein are only examples, and there are many other scenarios to which the present invention will apply.

Figure 2:
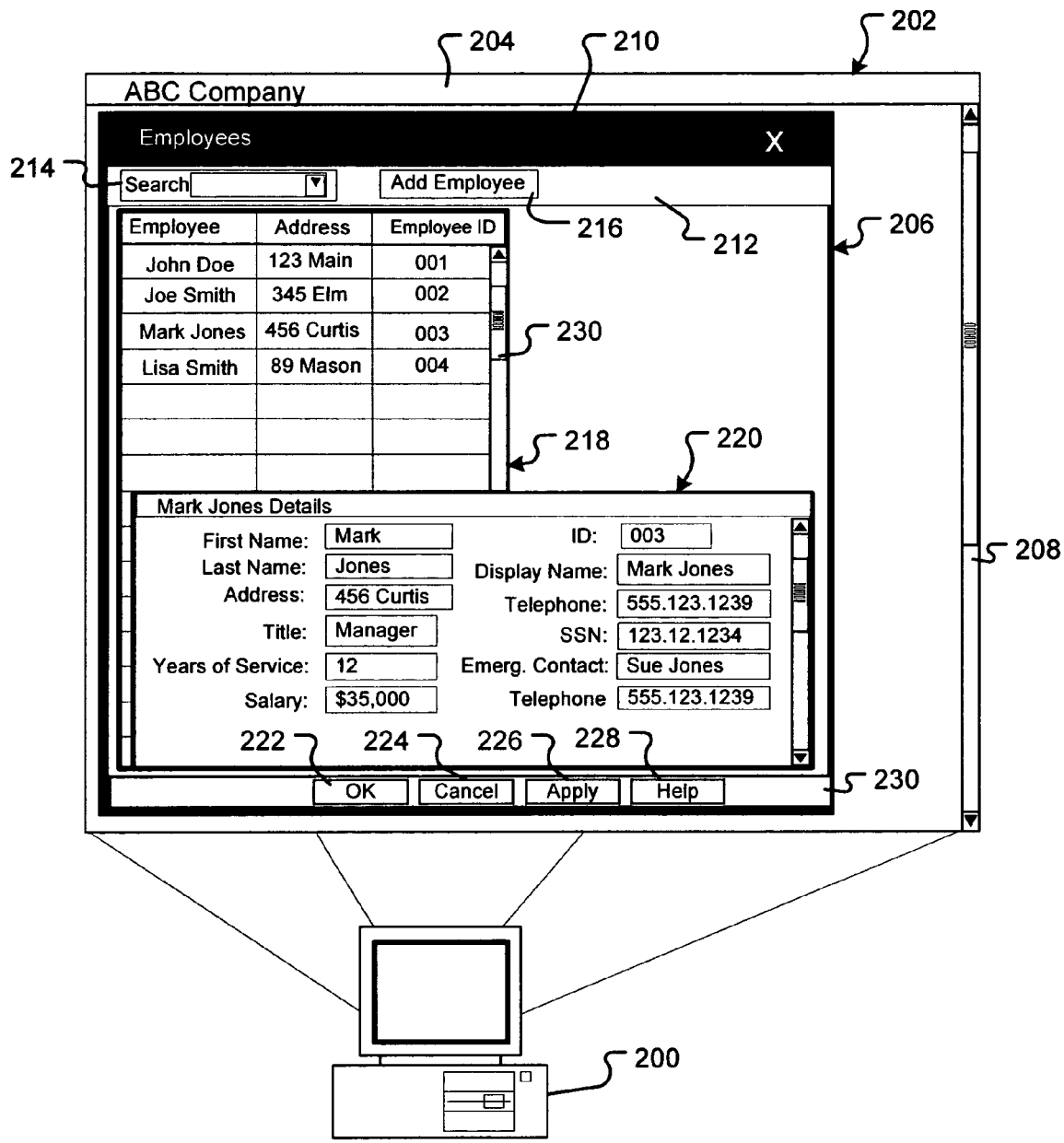
FIG. 2 is an exemplary illustration generally representing a user interface display for an application, in accordance with an aspect of the present invention.

Turning to FIG. 2 of the drawings, there is shown an exemplary illustration generally representing a user interface display for an application. The computer system 200, which may be representative of computer system 110 in FIG. 1, may render user interface elements for display on display screen 202. The display screen 202 is enlarged in FIG. 2 to show details of the display. The display 202 may relate to a display of an example company application used to manage different portions of a business, employee information for example. Those skilled in the art will appreciate that any other type of content or application may use the present invention.

In this particular example, the display 202 may have a title bar 204 and an employee window 206. There may be other windows for managing other information as indicated by scroll bar 208. Employee window 206 may have a title bar 210, a tool bar 212, and buttons 222, 224, 226, and 228 within flow panel 230. Tool bar 212 may provide user controls such as a search control 214 and an add employee control 216, among potentially many others. The user interface controls, buttons, title bars, scroll bars, tool bars and windows are generally known in the art as user interface elements. A user interface element may also be referred to as a user interface object and means, as used herein, any visual primitive used to build a graphical user interface screen including without limitation a listbox, combination box, menu, dialog box, a control, toolbar, a frame, a window, and so forth.

Within employee window 206, there are two sub-windows, such as employee list window 218 and employee detail window 220. In this particular example, employee window 218 displays a list of all the employees working for ABC Company. In a particular embodiment, each user interface element may be one of a group of user interface elements, such as window 206, 218 and 220, which may be stored in a database or other data store. Each user interface element may have an associated set of properties. For example, the properties for a window user interface element may include a size property, a position property, a background color property and so forth.

The present invention relates to the associating of user interface objects, such as the user interface elements represented by FIG. 1 in display 202, with user interface style properties in order to provide a layout representation to a rendering engine, which in turn may create the display representation, as shown in FIG. 1. User interface objects 202, 206, 208 and 212, for example, may each be displayed using the same basic style definition. For instance, the font size and background color used may be the same for each user interface object when displayed. In general, defining a basic style for displaying properties of a user interface element need only be done once by a developer of an application and that style may be used for other user interface elements that are to be displayed and, significantly, that style may be used by a developer for user interface elements in any number of other applications.

Figure 3:
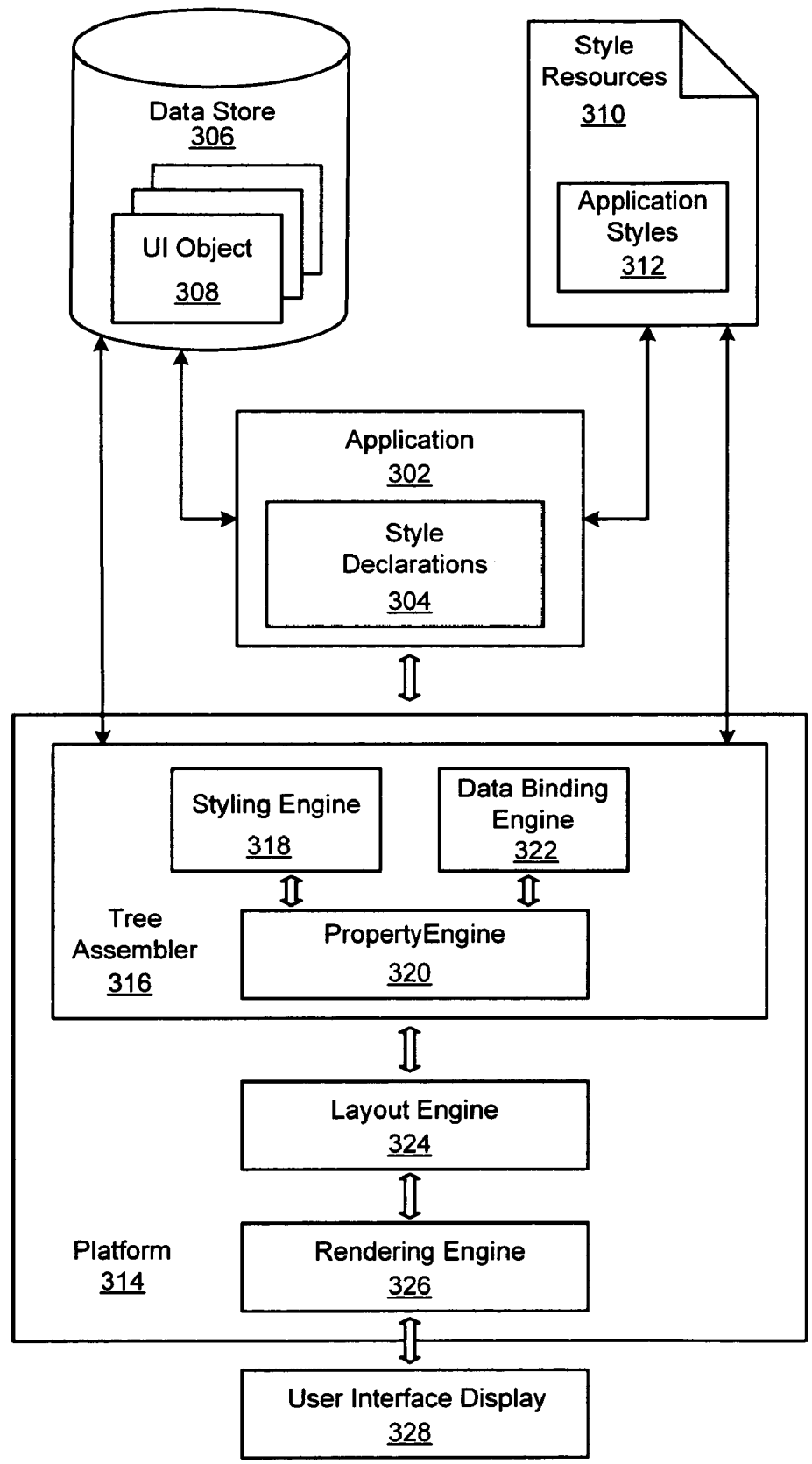
FIG. 3 is a block diagram generally representing an exemplary architecture for associating a style with one or more user interface elements for display, in accordance with an aspect of the present invention.

FIG. 3 presents a block diagram generally representing an exemplary architecture for associating a style with one or more user interface elements for display. Those skilled in the art will appreciate that the functionality implemented within the blocks illustrated in the diagram may be implemented as separate components or the functionality of several or all of the blocks may be implemented within a single component. For example, the functionality of the layout engine 324 may be included in the tree assembler 316, or the functionality of the property engine 322 may be implemented as a separate component from the tree assembler 316. In an embodiment all the components illustrated in FIG. 3 may reside and operate on a single computer system such as system 110 described in conjunction with FIG. 1. Alternatively, one or more of the components illustrated in FIG. 3 may be performed on separate computer systems in a distributed network, as is known to those skilled in the art.

An application 302 may be any executable software code including a kernel component, an application component, a linked library, an object, and so forth. Furthermore, an application 320 may be any number of different computer applications or programs developed for use on many different types of computer systems. For example, the application 302 may be an employee management application such as described in conjunction with FIG. 2. The application 302 may execute on a computer system such as computer system 110 to display elements of a user interface, among other things. In an embodiment, the application 302 may access a data store 306, which may persistently store, among other items, a plurality of user interface objects 308. Each user interface object 308 may include associated methods and events (not shown). In accordance with embodiments of the present invention, the objects may be user interface elements that may be independent of any associated style for rendering a display representation of the user interface elements.

In order to associate a style with a user interface element, the application 302 may access style resources 310. The style resources 310 may be style definitions developed or designed by the developer of the application 302 or the definitions 310 may be created by a third party. The style definitions relate to the actual style properties to be associated with the user interface objects 306 of an application in order for the user interface elements to be ultimately displayed. Among the style resources 310, there may be application styles 312 that may be used in general for developing an application. An application style may be stored separately from the user interface objects and may be relatively independent of the user interface objects themselves. An application style may influence the display of user interface objects in three principal ways: (1) by specifying property values for the user interface object itself, (2) by specifying an internal representation for the user interface object, such as a visual subtree, and (3) by specifying additional property values that may be applied conditionally to a user interface object, such as visual triggers. For instance, style definitions may include user interface element properties such as the background color, the foreground color, border thickness, font size (such as 12 or 10 point, etc.), font type (such as Arial or Courier, etc.), font color (such as black or red, etc.), attributes (such as bold or italics, etc.), and so forth. Also, the style definition may also describe a visual subtree to aid in the creation of an internal visual representation of the user interface objects, such as where a given user interface object should be displayed. The visual tree is discussed in more detail below.

In an embodiment, the application 302 may have style declarations that may associate properties of the style resources 310 to user interface objects 308. The style declarations 304 may provide the declarative program statement(s) that associates one or more user interface objects to an application style. Such an association may be made by explicitly identifying the object types and the application style for that type, or by providing a default style, or by inheritance from a parent object, or by some other method.

Application 302 may operate on platform 314. Platform 314 may include the framework or application programming interface (API) that may provide the necessary communication between the application 302 and the operating system of the computer, such as computer 110 shown in FIG. 1. As such, the platform 314 may provide the intermediate functions and services that may allow the application 302 to ultimately display user interface elements, such as user interface objects 308, on a user interface display 328. Although not shown, the operating system and its necessary operations occur between platform 314 and display 316. In a particular embodiment of the invention, the platform 314 may be the Microsoft Windows platform developed by Microsoft Corporation.

Within the platform 314, a tree assembler 316 parses the information received from the application 302 in order to build a "visual tree" which is an internal representation of the display and thus represents the combination of the user interface objects 308 to be displayed and the information from the style resources 310 that describes how to display the data. The visual tree is described in more detail below in conjunction with FIG. 5. In an embodiment, the tree assembler 316 includes a styling engine 318 for locating and applying the appropriate style elements, a property engine 320 for locating the appropriate property values, and a data binding engine 322 to associate properties of the user interface elements with properties on data objects. In one embodiment, the application 302 may make requests to the styling engine 318 to lookup the correct style definition, then the application 302 may make requests to the property engine 320 to lookup the appropriate property values specified by the style definition, and finally the application 302 may make requests to the data binding engine 322 to bind properties of the user interface elements with properties on data objects. These requests may be declarative, i.e., interpreted by the tree assembler 316, or procedural, i.e., the application 302 calls the binding methods at runtime. Additionally, databinding can also be performed by aliasing to create associations between properties on the elements in a visual tree and the properties of the element being styled, also referred to as the styled parent. This may allow a user of a user interface object such as a component to manipulate properties of the visual tree via direct object manipulation on the component itself. In one embodiment, the association of the properties may be stored in the style. Moreover, the application styles 312, may also have a declarative request for binding to data as well. In such a case the data binding engine 322 may handle these requests too. More details of the binding process may be found in copending U.S. patent application Ser. No. 10/440,081, titled "SYSTEM AND METHOD FOR CONTROLLING USER INTERFACE PROPERTIES WITH DATA" filed on Oct. 23, 2003, assigned to the assignee of the present application, and incorporated herein by reference for all that it discloses and teaches.

In an embodiment, the tree assembler 316 receives the user interface objects and the style information directly from the application 302. In other embodiments, the tree assembler 316 may access the required user interface objects directly from the data store 306 and the styles resources 310, respectively, through the operation of the data binding engine 322. In doing so, the tree assembler 316 understands where to look and what to find based on the style binding information received from the application's style declarations 304.

The tree assembler 316 may complete the visual tree and pass the tree to the rendering engine 326. In an embodiment, the tree may be passed relatively directly to the rendering engine 326, which, in turn may use the visual tree to render a display representation of the user interface elements on the user interface display 328. In an alternative embodiment, the visual tree may be passed first to a layout engine 324 that may add more information to the visual tree, using user interface elements from a user interface object factory to complete the tree. The layout engine, in an embodiment, may understand the physical properties of the display such that it may determine where to place certain display items and how large to make them relative to the physical characteristics of a particular computer system. The application 302 and the tree assembler 316 may typically operate in a dynamic environment whereby the tree assembler 316 may make an initial visual tree and, as the application 302 runs and display items may change, the tree assembler 316 may rewrite or modify the visual tree to update the display representation on the user interface display 328.

A style may be considered a set of property values that may be applied to a user interface element for presenting a display representation of the user interface element. Associating a set of property values with a user interface element may be accomplished in several ways so that the set of property values may be applied to the user interface element. For example, property values may be set on a user interface element directly, either as a local value or as a global value. A local value may be assigned or may be referenced through databinding. In the case of databinding, a user interface element of an application may be bound to a property that references a local value defined by the application. Alternatively, a user interface element may be bound to a property that references a property value of another user interface element. Or a property may reference a global value such as a defined resource value.

Property values may also be associated with a user interface element using a defined style. FIG. 4 presents an illustration generally representing exemplary markup language for defining a style and associating the defined style with a user interface element. The exemplary markup language, XAML, is one embodiment of the way in which the concepts described herein may be implemented and should not be considered limiting to the syntax shown. A style may be defined as a resource in a declaration of a user interface element as is shown in this embodiment. For example, lines 402 through 424 of FIG. 4 may define a user interface element, a FlowPanel which may be similar to FlowPanel 230 of FIG. 2. Within the declaration of the FlowPanel, lines 404-418 may represent a resource section named FlowPanel.Resources that may include resources that apply to the FlowPanel. In this resource section, there are shown two different style declarations that each may define a different style property set.

One style declaration may have an implicit name and is an example of a style declaration that may specify the type of user interface element to which it may be applied. A style declaration with an implicit name as used herein means an unnamed style that may apply any declared property values to the type of the declared user interface element whenever a specific property value for the user interface element is not otherwise applied by an explicit style declaration. Lines 406-410 show a style declaration with an implicit name for a property set that may apply to a user interface element of type button. When this style is applied to a button, it may make the background of the button red in the display representation of the button. The other style declaration shown is an example of an explicit style declaration for a property set in lines 412-416. Notice that a name, "BlueButtonStyle" in this example, has been given to this style. An explicit style declaration as used herein means an explicitly named style that may apply any declared property values to the declared user interface element and takes precedence over any specific property value for the user interface element that may be declared by a style declaration with an implicit name. When this style is applied to a button, it may make the background of the button blue in the display representation of the button. Thus, a style may be declared by an application developer that may generally apply any declared set of property values to a type of user interface element, and a style may be explicitly declared by an application developer specifying a set of property values that may be applied to a given user interface element which may override any corresponding property values declared in general for that type of user interface element.

Lines 420 and 421 of FIG. 4 illustrate associating a defined style with a user interface element. For example, two user interface elements, namely buttons, are declared within the declaration of the FlowPanel. The first button declaration on line 420 assigns "OK" as the content of the button. The style associated with this button may be the style declaration of the set of property values on lines 406-410 which implicitly may apply any declared property values of the set as ambient values to all buttons in the user interface element unless a specific property value is otherwise explicitly declared to apply. The second button declaration on line 421 assigns "BlueButtonStyle" as the style for this button and assigns the value of the resource named "Content" as the content of the BlueButtonStyle resource. The style associated with this button may be the style declaration of the set of property values on lines 412-416 which may override any corresponding property values declared in general for that type of user interface element appearing on lines 406-410 and may explicitly apply the declared property values of the set on lines 412-416 to the button. Any property values implicitly declared for the user interface element of type button may also be applied to this button for any property values not explicitly declared by "BlueButtonStyle".

In one embodiment, a style may be considered a resource that may be placed in a dictionary of object and associated key values. For instance, the braces surrounding the name "BlueButtonStyle" in line 422 may indicate that BlueButtonStyle is a named resource that may be located, for instance, in the resource section of the user interface element declaration and also be placed in the dictionary. The syntax of "def:name=" in an explicit declaration of a style may be one way to provide a key to the style resource that is placed in the dictionary. In the case where a declared style is not explicitly named, then the type of the user interface element may automatically be used as a key to locate the style resource in the dictionary. Thus, the style declaration of line 408 with an implicit name may also provide a key which is a type named button. By default, a user interface element may therefore have a key that is the type of the user interface element. In another embodiment, if a style resource cannot be located for a given type, then the style resource with the nearest base type of that given type may be used.

Generally, any type of user interface element that may be defined can appear in a style declaration. Those skilled in the art will appreciate that a set of property values in a style definition may also be associated with a user interface element in other ways. For example, a set of property values may be applied through databinding. Consequently, when a style may be applied to a user interface element, its bindings may be applied to only those properties of the user interface element whose local values are not set. Moreover, style bindings applied to a user interface element that may not include an explicit source may use the ambient value of the property defined for that user interface element.

Besides defining a set of property values, a style may also define elements for building a visual tree used for presentation of the display representation of user interface elements. In one embodiment, a logical tree may be used which may abstract elements of the visual tree including styling of those elements. Each user interface element may define a model that represents logical children of the user interface element and may include a style for the logical children of the user interface element. For example, a button may define a single unit of content as a logical child and may define the style for presentation of the content. This may allow an interactive element to delegate its style of a visual presentation to a logical tree which may then be mapped to the element of the visual tree.

Lines 426-454 illustrate a style definition of a button that includes a definition of property values for building a visual tree in lines 430-440 for presentation of the button. The style declaration of line 428 assigns a font size of 12 to a user interface element of type button. Property values for building a visual tree for presentation of the button are defined in lines 430-440. For example, line 432 may define the background of the border of the button, line 434 may define the thickness of the border of the button, and line 436 may define the content within the border of the button. When such style declarations may be applied to the visual tree, objects associated with the user interface element may be created within the visual tree. For instance, a representation of a border may be created as a child object underneath the object representing the button and a representation of the text, "OK", with a font size of 12 may be created as an object underneath the object representing the border.

In setting the property values for building a visual tree, aliasing of property values may be employed for providing a consistent style. The syntax of "*Alias" in lines 432-436 may represent aliasing of a property value. In particular, aliasing allows the value of a style property of an object in the visual tree to be assigned the value of that property set for a style parent object in the visual tree. For example, the property value for the background color of the border in line 432 may be assigned the value of the background color of the button. Similarly, the property value for the border thickness in line 434 may be assigned the value of the border thickness for the button. Likewise, the property value for the text content in line 436 may be assigned the text content of the button. Thus aliasing of style property values may leverage element composition in assembling a rich hierarchy of style property values in building a visual tree.

In addition to defining a set of property values and defining a set of property values for building elements of a visual tree, a style may also define visual triggers which may be additional property values that may be applied conditionally to a style object. In one embodiment, there may be two types of visual triggers: property triggers and an event trigger. A visual trigger that is an event trigger may enable additional properties to be applied when an event occurs. In this case, the current values of the properties may be replaced by the values of the additional respective properties applied upon occurrence of the event. A visual trigger that is a property trigger may enable additional properties to be applied based on a change in the value of a property on a user interface element. In this case, the current values of the properties may be temporarily replaced by the values of the respective additional properties and may be automatically restored when the triggered condition is no longer satisfied. Moreover, in one embodiment, a property trigger may also define property value changes to apply when entering and exiting a triggered state. In general, a visual trigger may set a value of a property by specifying a value to apply and by specifying a path to the property.

Lines 442-452 of FIG. 4 illustrate a style definition of a visual trigger within the style definition of a button. In specific, a property trigger is defined in lines 444-450 that specifies if the value of the property "IsPressed" becomes "True", then the color of the background filler of the button should become goldenrod and the font type should become italic. The property trigger illustrated in FIG. 4 is one kind of trigger of an extensible base class for providing a dynamic change of style. For example, a single trigger may be defined where property values may be set by specifying a list of conditions. Those skilled in the art will also appreciate that there may be other types of triggers used for providing a dynamic change of style. For instance, there may be event triggers that may be based upon events such as system events or user input events, or there may be triggers that may be based upon a command being executed, and so forth. Where there are multiple visual triggers defined, the order of the visual triggers may matter. In one embodiment, visual triggers defined later may override the behavior of visual triggers defined earlier in a sequence of visual trigger definitions.

A style may be explicitly based on another style. The derived style may be BasedOn a base style. Lines 456-466 generally illustrate a style definition of a set of property values for a base style and a style definition of a set of property values for a derived style. In lines 456-460, a base style is explicitly declared which is named ButtonStyle and may make the background color red when applied to a button. In lines 462-466, a derived style is then explicitly declared which is named OtherButtonStyle and may make the font size 12 and the foreground color yellow. This derived style may be derived from the base style named ButtonStyle as shown by the declaration in line 462 where the property set is based on the resource style named ButtonStyle. As a result, the set of property values that may be associated with a button include the combined property set values defined in the declaration of the base style named ButtonStyle and the derived style named OtherButtonStyle. When OtherButtonStyle is applied to a button, the button will not only get a font size of 12 and a foreground of yellow, the button will also get a background of red.

In order to combine the property set values of the base style and the derived style, the property set values may be merged. If there is more than one value declared for an identical property among the property sets to be merged, then the most derived property value may be chosen to be applied to the user interface element. The most derived property as used herein may mean the property value defined at the lowest level in the hierarchy of property values declared by basing a style upon another style. For example, if there is a background property value set in a base style and the background property value is also set in the derived style, then the background property value of the derived style may be applied to the user interface element since it is the most derived in the hierarchy of property values declared. Similarly, bindings of derived styles may be more derived than bindings of a base style.

Just as the property set of a style may be based on another property set of a style, a style definition of a visual tree may be based on another style definition of a visual tree. In general, a base style's visual tree may be inherited in the derived style where there is no visual tree specified in the derived style. When the derived style is using the base style's visual tree, the derived style may not modify the visual tree of the base style. Where a visual tree is specified in the derived style, the definition of the visual tree defined by the most derived style is chosen to be applied. When the visual tree specified in a derived style is applied, none of the property sets or visual triggers associated with the base style visual tree may be applied.

Additionally, a style definition for a visual trigger may be based on another style definition of a visual trigger. In one embodiment, if there is more than one value declared for an identical property among the property sets of visual triggers to be merged, then the most derived property value may be chosen to be applied to the user interface element. However, in this embodiment, only property values of visual triggers may be merged that may be applied to those elements that are defined in the visual tree for that user interface element associated with the derived visual trigger style. Property values of a base visual trigger style may not be merged with the property set of values of a derived visual trigger style where the property value of the base visual trigger style does not apply to an element defined within the visual tree for the user interface element associated with the derived visual trigger style.

Figure 5:
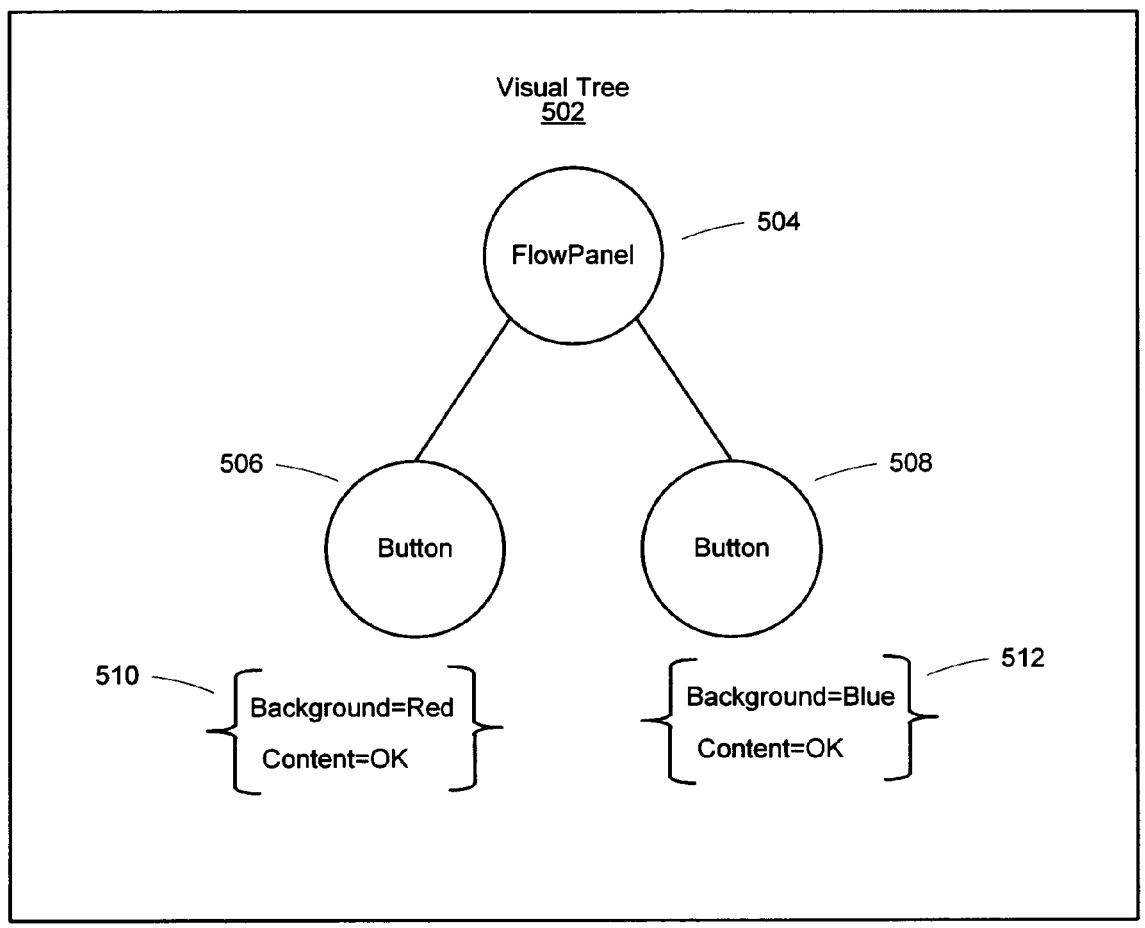
FIG. 5 is an illustration generally representing an exemplary visual tree for a user interface element, in accordance with an aspect of the present invention.

FIG. 5 presents an illustration generally representing an exemplary visual tree for a user interface element, namely the FlowPanel defined in lines 402-424 of FIG. 4. A "visual tree" may be a representation in a tree-like structure having nodes for the visual representation of the user interface elements to be displayed. Not all user interface elements may be in a visual tree because not all user interface elements may have visual information. The FlowPanel may be one of many user interface objects presented on a visual display, and, consequently, the visual representation for the FlowPanel may be a visual subtree 502 which represents only part of a potentially larger visual tree that may include all the user interface objects presented on a visual display. In general, the tree assembler, such as tree assembler 316 shown in FIG. 3, may set the assigned property values of the FlowPanel, create a copy of the visual subtree specified by the style, and add the visual subtree to the visual tree.

The first item shown in the visual subtree 502 is a FlowPanel item 504. When building the tree, the tree assembler may encounter the FlowPanel item declared on line 402 in FIG. 4. Upon encountering the FlowPanel declaration, a node for the FlowPanel item 504 may be created to be placed in the visual subtree. Next, an inquiry may be performed to determine the style information for the FlowPanel item. Such style information may include property values of the FlowPanel as well as property values of the visual subtree for the FlowPanel. This visual subtree might contain borders or shading information, a background color, and so forth.

The tree assembler may subsequently encounter the button item declared on line 420 in FIG. 4, and a node for the button item 506 may be created and placed underneath the node for the FlowPanel 504. An inquiry to determine the style information for the button item may then be performed that may locate the style resource declared with an implicit name at lines 406-410 of FIG. 4 which may apply to an element of type button. The properties 510 such as the background property and the content defined in that style resource may be stored with the node for the button 506.

Similarly, the tree assembler may then encounter the button item declared with an explicit style on line 422 in FIG. 4, and a node for this button item 508 may be created and placed underneath the node for the FlowPanel 504. An inquiry may then be performed to locate the style resource declared with an explicit name at lines 412-416 of FIG. 4. The properties 512 such as the background property and the content defined in that style resource may be stored with the node for the button 508. After creating the subtrees for the buttons and adding them to the node for the FlowPanel 504, the visual subtree for the FlowPanel may be completed.

Upon completing the visual subtree 502 and adding the visual subtree 502 to the visual tree, the visual tree may be passed to a layout engine, such as engine 324 in FIG. 3 for including additional user interface elements prior to being sent to the rendering engine 326. In another embodiment, the layout engine may call the tree assembler as needed to generate the tree just in advance of the layout process. Rendering engine 326 may render a display representation from the visual tree for presentation on a user interface display.

Figure 6:
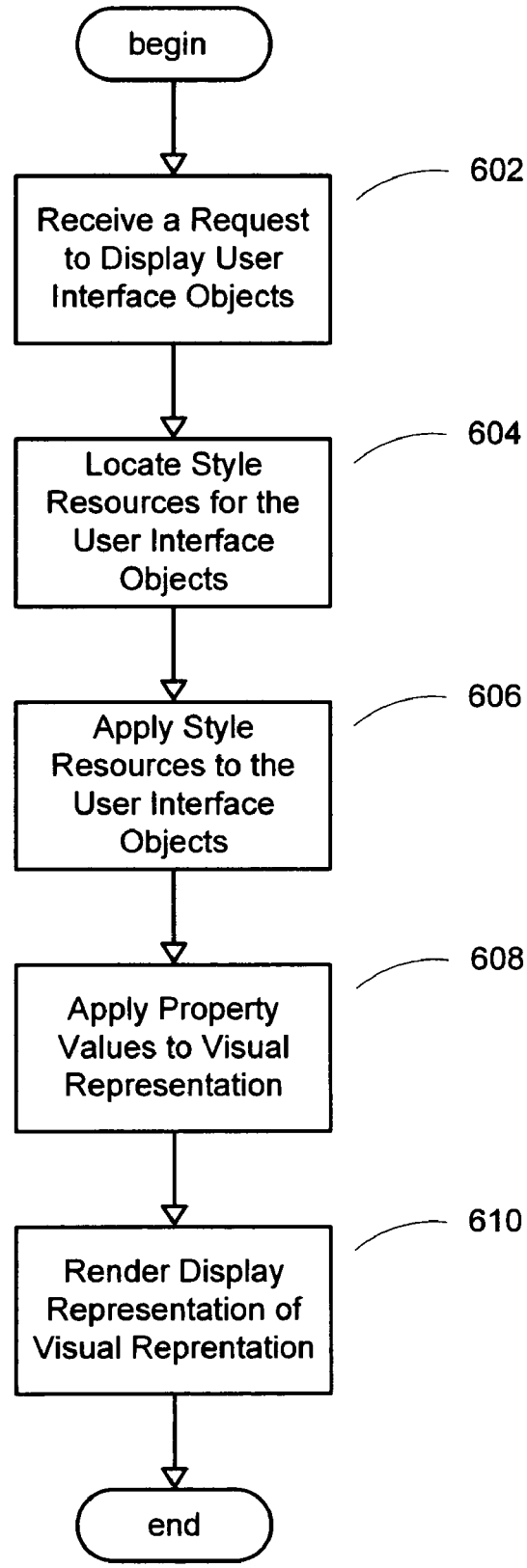
FIG. 6 is a flowchart generally representing example steps undertaken for displaying a user interface object using a separate style resource, in accordance with an aspect of the present invention.

FIG. 6 presents a flowchart generally representing example steps undertaken for displaying a user interface object using a separate style resource. Those skilled in the art will appreciate that an implementation may choose to perform these steps in a different order for purposes of efficiency or flexibility, while achieving the same effect and without departing from the scope of the present invention. In one embodiment, an application such as application 302 in FIG. 3 may be running on a platform, such as platform 314 in FIG. 3, which is executing on a computer system, such as computer system 110 in FIG. 1.

At step 602, a request to display one or more user interface objects may be received. Upon receiving the request, one or more style resources associated with the user interface objects may be located at step 604. To locate the style resources associated with the user interface objects, a style lookup may be performed to determine whether a style was declared by the application such as in style declarations 304 of FIG. 3, or whether a default style was provided for the user interface objects, or whether property values may be inherited from a parent user interface object if a style defining that property value is not found.

Upon locating the style resources associated with the user interface objects, the style resources may be applied to the user interface objects at step 606. In applying the style to a user interface object, any property values defined for the visual representation of the user interface object, such as a set of property values for building a visual tree, may be applied at step 608. To apply the property values defined for the visual tree, for instance as generally described with respect to the illustration of FIG. 6, the assigned property values may be set for the user interface object, a copy of the visual subtree specified by the style may be created for the user interface object, and the visual subtree for the user interface object may be added to the visual tree. Any property values declared in the style definition using databinding may also be resolved in building the visual tree. After applying the property values defined for the visual representation of the user interface object, a display representation of the visual representation may be rendered at step 610. Upon rendering the display representation, the process is finished.

Figure 7:
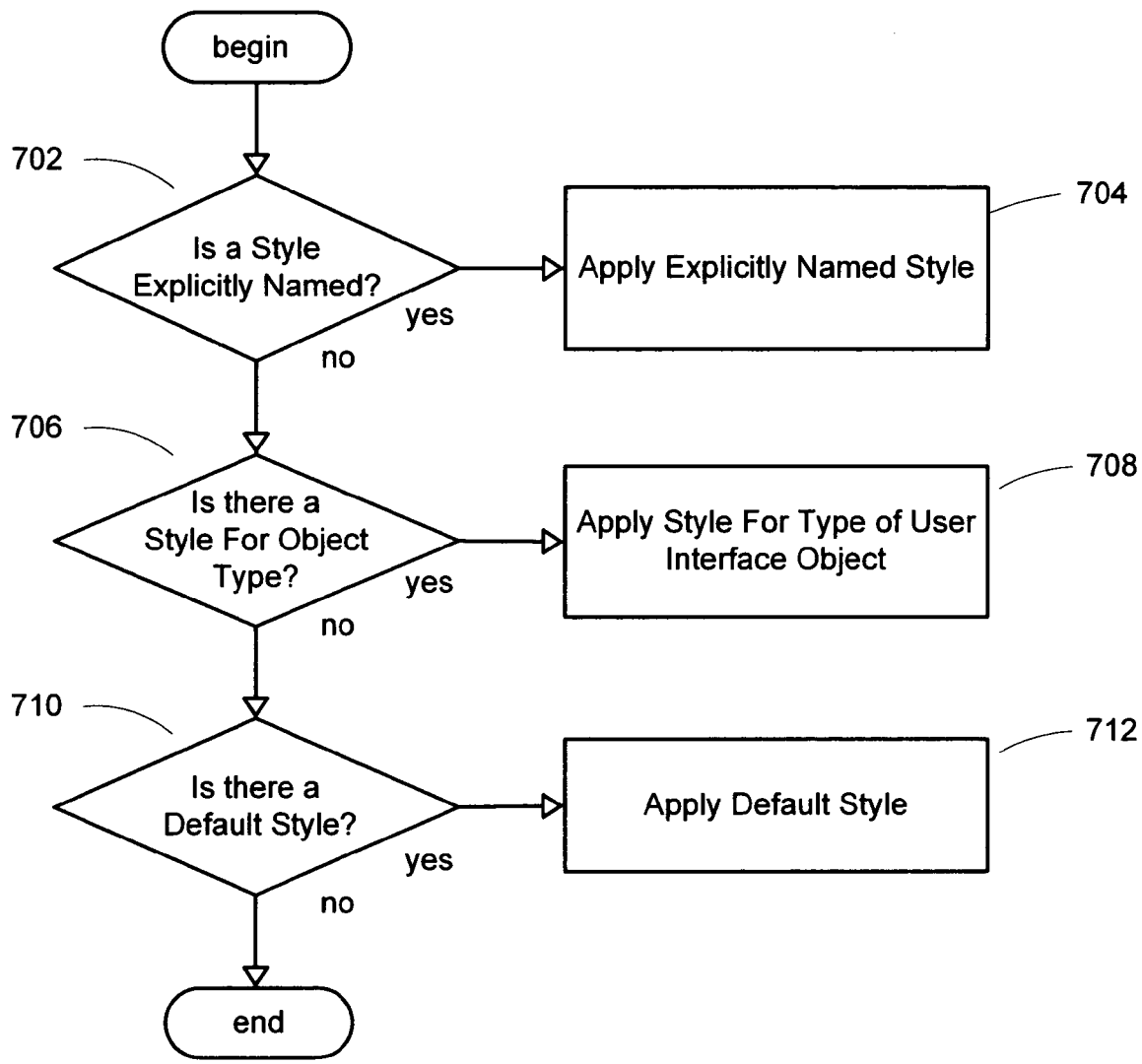
FIG. 7 is a flowchart generally representing in one embodiment example steps undertaken in order of priority for determining which style resource to apply to a user interface object, in accordance with an aspect of the present invention.

FIG. 7 presents a flowchart generally representing in one embodiment example steps undertaken in order of priority for determining which style resource to apply to a user interface object. A style lookup may first be performed to determine first whether a style was explicitly named in reference to a user interface object at step 702. If a style was explicitly named in reference to the user interface element, then that style may be applied to the user interface element at step 704. Otherwise, a style lookup may determine at step 706 whether there was a style specified for the type of the user interface object. If a style was specified for the type of the user interface object, then that style may be applied to the user interface element at step 708. Otherwise, a style lookup may determine at step 710 whether any default style was specified that may be applied to the user interface object. If so, that default style may be applied to the user interface object at step 712 and processing is finished.

Figure 8:
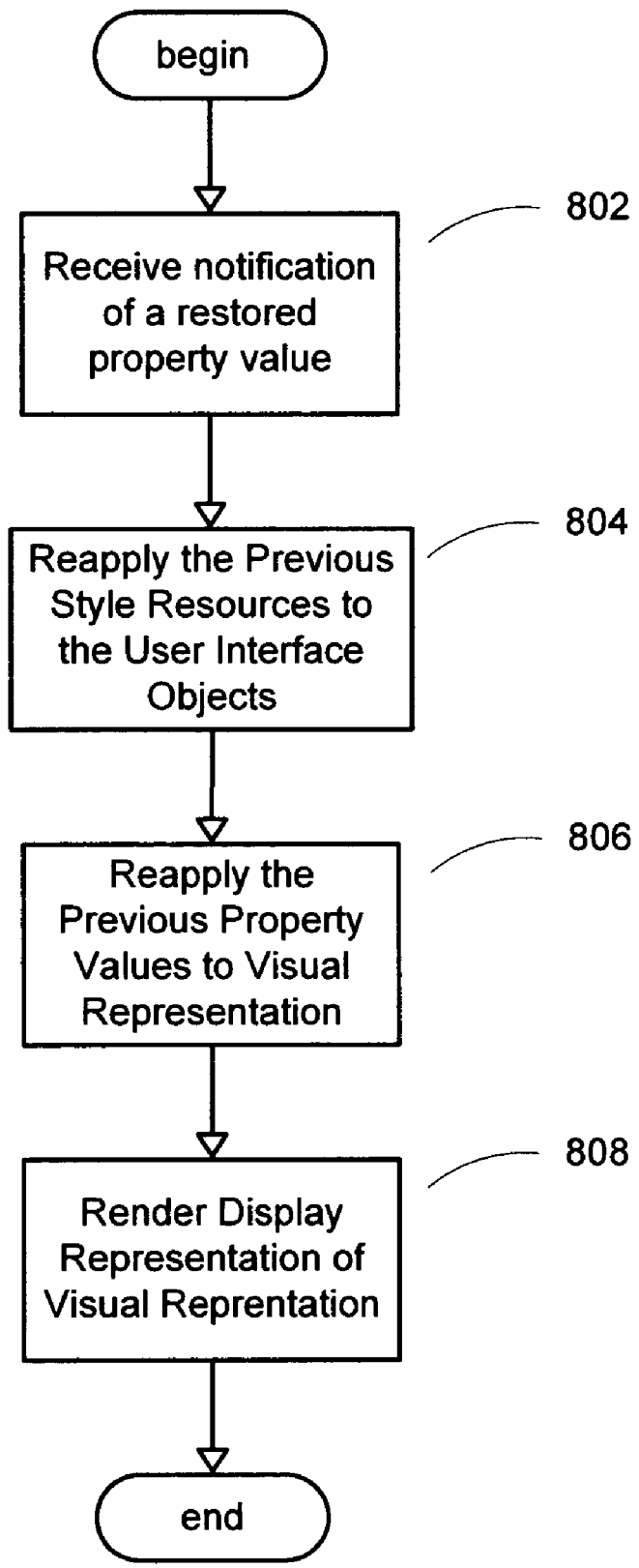
FIG. 8 is a flowchart generally representing example steps undertaken in one embodiment for automatically restoring the prior property values when a condition of a visual trigger is no longer satisfied, in accordance with an aspect of the present invention.

When a style that defines a visual trigger is applied, additional property values may be applied to a user interface object upon occurrence of a condition. In the case of a property trigger, the current values of the properties may be temporarily replaced by the values of the respective additional properties and then may subsequently be automatically restored when the triggered condition is no longer satisfied. When notification is received of a change in the property value set as a property trigger, then steps 604-610 may be performed to locate and apply the additional property values for rendering the user interface objects for display. FIG. 8 presents a flowchart generally representing example steps undertaken in one embodiment for automatically restoring the prior property values when the changed property value is restored.

At step 802, notification of the restored property value may be received. The style resources applied prior to the occurrence of the condition may be restored at step 804. In applying the previous property values of the style resources, any previous property values defined for the visual representation of the user interface object, such as a set of property values for building a visual tree, may be reapplied at step 806. And then a display representation of the visual representation may be rendered at step 808. Upon rendering the display representation, the process for automatically restoring the previous property values may be finished.

Using the above systems and methods, an application author may provide customized styles for user interface objects in an application. The defined styles can be used for one or more different user interface objects, in accordance with aspects of the present invention. Importantly, the application author can assign style information in a declarative manner to program how a user interface element may look when displayed and how an end user might interact with the user interface elements. In doing so, the style resources may be separated from the user interface elements. Consequently, the author or an end user may change the style resources without changing the user interface elements. Likewise, the author may adjust the user interface elements without changing the style resources.

As can be seen from the foregoing detailed description, the present invention provides an improved system and method for displaying a user interface object using an associated style. A style resource may be customized and applied to any type of user interface object to define how the user interface object will look during interactions with a user. The architecture of the present invention may support a number of ways to provide a style for a user interface object, including by name, by type, by default, and so forth. In general, defining a basic style for displaying properties of a user interface element need only be done once by a developer of an application and that style may be used for other user interface objects that are to be displayed and, significantly, that style may be used by a developer for user interface objects in any number of other applications. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system, including at least a processor, memory and a display, for displaying one or more user interface objects according to a user-designed style, each user interface object being part of the user interface of a corresponding software application, the computer system comprising:

one or more user interface objects including user interface controls, buttons, title bars, scroll bars, tool bars, list boxes, combination boxes, menus, dialog boxes, frames and windows;

a locating mechanism configured to locate one or more style resources associated with the one or more user interface objects, the style resources having a plurality of sets of user-defined property values to be selectively applied to one or more of the user interface objects based on a state of one or more visual triggers, the user-defined property values being configured to override any default values corresponding to the interface objects, the visual triggers including one or more user inputs indicating an interaction with the software application's user interface;

a first detecting mechanism configured to detect that a first visual trigger indicating a first interaction with the software application's user interface corresponding to a first set of user-defined property values has been triggered;

a first styling engine operably coupled to the one or more style resources and the one or more user interface objects for applying the first set of user-defined property values of the one or more style resources to the one or more user interface objects such that corresponding default property values for the style resources are overridden;

a second detecting mechanism configured to detect that a second visual trigger indicating a second, different interaction with the software application's user interface corresponding to a second set of user-defined property values has been triggered and further configured to detect, during operation of the software application, that that at least one of the user inputs indicating an interaction with the software application's user interface that triggered the second visual trigger corresponding to the second set of user-defined property values is no longer triggering the second visual trigger;

a second styling engine operably coupled to the one or more style resources and the one or more user interface objects for applying the second set of user-defined property values of the one or more style resources to the one or more user interface objects such that the first set of user-defined property values for the style resources is overridden;

a restoring mechanism configured to automatically restore the first set of user-defined property values during operation of the software application such that the second set of user-defined property values for the style resources is overridden by the restored first set of user-defined property values;

a tree assembler operably coupled to the styling engine for generating a visual representation of the one or more user interface objects with the applied first set of user-defined property values of the one or more style resources for rendering; and a rendering engine operably coupled to the tree assembler for rendering a display representation of the visual representation for presentation on a user interface display.

2. The system of claim 1 further comprising an application operably coupled to the one or more style resources and the one or more user interface objects, the application having style declarations for associating the one or more style resources with the one or more user interface objects.

3. The system of claim 1 further comprising a property engine operably coupled to the first styling engine for locating the property values.

4. The system of claim 1 further comprising a data binding engine operably coupled to the first styling engine for binding the property values.

5. The system of claim 1 further comprising a layout engine operably coupled to the tree assembler for generating a layout of the one or more user interface objects with the applied property values of the one or more style resources.

6. The system of claim 1 further comprising a user interface display operably coupled to the rendering engine for displaying the display representation.

7. The system of claim 1 wherein the one or more styling resources comprises an application style.

8. A method for displaying one or more user interface objects according to a user-designed style, each user interface object being part of the user interface of a corresponding software application in a computer system, the method comprising:

receiving a request to display one or more user interface objects including user interface controls, buttons, title bars, scroll bars, tool bars, list boxes, combination boxes, menus, dialog boxes, frames and windows;

locating one or more style resources associated with the one or more user interface objects, the style resources having a plurality of sets of user-defined property values to be selectively applied to one or more of the user interface objects based on a state of one or more visual triggers, the user-defined property values being configured to override any default values corresponding to the interface objects, the visual triggers including one or more user inputs indicating an interaction with the software application's user interface;

detecting that a first visual trigger indicating a first interaction with the software application's user interface corresponding to a first set of user-defined property values has been triggered;

applying the first set of user-defined property values of the one or more style resources to the one or more user interface objects such that corresponding default property values for the style resources are overridden;

detecting that a second visual trigger indicating a second, different interaction with the software application's user interface corresponding to a second set of user-defined property values has been triggered;

applying the second set of user-defined property values of the one or more style resources to the one or more user interface objects such that the first set of user-defined property values for the style resources is overridden;

during operation of the software application, detecting that at least one of the user inputs indicating an interaction with the software application's user interface that triggered the second visual trigger corresponding to the second set of user-defined property values is no longer triggering the second visual trigger;

during operation of the software application, automatically restoring the first set of user-defined property values such that the second set of user-defined property values for the style resources is overridden by the restored first set of user-defined property values;

generating a visual representation of the one or more user interface elements with the applied first set of user-defined property values of the one or more style resources; and rendering a display representation of the visual representation for presentation on a user interface display.

9. The method of claim 8 further comprising associating the one or more style resources with the one or more user interface objects.

10. The method of claim 9 wherein associating the one or more style resources with the one or more user interface objects comprises providing style declarations assigning one or more style resources with one or more user interface objects.

11. The method of claim 8 further comprising binding the property values with properties on data objects.

12. The method of claim 11 wherein binding the property values with properties on data objects comprises binding to a local property value defined by an application.

13. The method of claim 11 wherein binding the property values with properties on data objects comprises binding one or more user interface objects to a property value that references a property value of another user interface object.

14. The method of claim 8 further comprising generating a layout of the one or more user interface objects with the applied property values of the one or more style resources.

15. The method of claim 8 further comprising displaying the display representation on the user interface display.

16. The method of claim 8 further comprising providing declarations that define the one or more style resources with one or more property values to be selectively applied to the one or more user interface objects.

17. The method of claim 16 wherein providing declarations that define the one or more style resources with one or more property values comprises providing a declaration specifying the type of user interface element to which the one or more property values may be applied.

18. The method of claim 16 wherein providing declarations that define the one or more style resources with one or more property values comprises providing a declaration explicitly naming the style resource.

19. The method of claim 16 wherein providing declarations that define the one or more style resources with one or more property values comprises providing a declaration specifying one or more property values to be selectively applied to the visual representation of the one or more user interface objects and wherein applying the property values of the one or more style resources to the one or more user interface objects comprises applying the one or more property values to the visual representation of the one or more user interface objects.

20. The method of claim 19 wherein providing a declaration specifying one or more property values to be selectively applied to the visual representation of the one or more user interface objects comprises aliasing the one or more property values to assign the value of one or more property values of another user interface object in the visual representation.

21. The method of claim 16 wherein providing declarations that define the one or more style resources with one or more property values comprises providing a declaration specifying the one or more property values to be conditionally applied to the one or more user interface objects.

22. The method of claim 21 wherein specifying the one or more property values to be conditionally applied to the one or more user interface objects comprises specifying the one or more property values to be conditionally applied to the one or more user interface objects upon occurrence of an event.

23. The method of claim 21 wherein specifying the one or more property values to be conditionally applied to the one or more user interface objects comprises specifying the one or more property values to be conditionally applied to the one or more user interface objects upon a change in the value of a property on a user interface element.

24. The method of claim 16 wherein providing declarations that define the one or more style resources with one or more property values comprises providing a declaration that defines the one or more style resources based on another style resource.

25. The method of claim 24 wherein providing a declaration that defines the one or more style resources based on another style resource comprises providing a declaration that defines the one or more style resources by specifying one or more property values to be selectively applied to the visual representation of the one or more user interface objects based on another style resource.

26. The method of claim 24 wherein providing a declaration that defines the one or more style resources based on another style resource comprises providing a declaration specifying the one or more property values to be conditionally applied to the one or more user interface objects based on another style resource.

27. The method of claim 8 wherein applying the property values of the one or more style resources to the one or more user interface objects comprises applying the property values of an explicitly named style resource to the one or more user interface objects in preference to applying the property values declared by specifying the type of user interface object to the one or more user interface objects.

28. The method of claim 8 wherein applying the property values of the one or more style resources to the one or more user interface objects comprises applying the most derived property values of a derived style resource to the one or more user interface objects in precedence to applying the property values of a base style resource to the one or more user interface objects.

29. The method of claim 8 wherein applying the property values of the one or more style resources to the one or more user interface objects comprises applying the most derived property values of a derived style resource specifying one or more property values to be applied to the visual representation of the one or more user interface objects in precedence to applying the property values of a base style resource to the visual representation of the one or more user interface objects.

30. The method of claim 8 wherein applying the property values of the one or more style resources to the one or more user interface objects comprises applying the most derived property values of a derived style resource specifying the one or more property values to be conditionally applied to the one or more user interface objects in precedence to applying the property values of a base style resource to the visual representation of the one or more user interface object.

31. The method of claim 8 wherein applying the property values of the one or more style resources to the one or more user interface objects comprises applying a later defined property value in a sequence of defined property values of a style resource specifying the one or more property values to be conditionally applied to the one or more user interface objects.

32. The method of claim 8 further comprising:
receiving notification of a change in a property value defined in a style resource as a condition for applying one or more property values to the one or more user interface objects;
applying the one or more property values to the one or more user interface objects;
generating a visual representation of the one or more user interface objects with the applied one or more property values; and
rendering a display representation of the visual representation for presentation on a user interface display.

33. The method of claim 32 further comprising:
receiving notification that the previous value has been restored to the property value that changed;
automatically restoring the one or more property values that were previously applied to the one or more user interface objects prior to receiving notification that the property value changed;
generating a visual representation of the one or more user interface objects with the applied one or more property values; and
rendering a display representation of the visual representation for presentation on a user interface display.

34. The method of claim 8 further comprising:
receiving notification of an event defined in a style resource as a condition for applying one or more property values to the one or more user interface objects;
applying the one or more property values to the one or more user interface objects;
generating a visual representation of the one or more user interface objects with the applied one or more property values; and
rendering a display representation of the visual representation for presentation on a user interface display.

35. A computer-readable storage medium having computer-executable instructions for performing the method of claim 8.

36. The method of claim 8, wherein the visual triggers include one or more system events associated with the software application.

37. The method of claim 8, wherein the visual triggers include the execution of one or more system software commands.

38. A method for displaying one or more user interface objects according to a user-designed style, each user interface object being part of the user interface of a corresponding software application in a computer system, the method comprising:
receiving a request to display one or more user interface objects including user interface controls, buttons, title bars, scroll bars, tool bars, list boxes, combination boxes, menus, dialog boxes, frames and windows;
locating one or more style resources associated with the one or more user interface objects, the style resources having a plurality of sets of user-defined property values to be selectively applied to one or more of the user interface objects based on a state of one or more visual triggers, the user-defined property values being configured to override any default values corresponding to the interface objects, the visual triggers including one or more user inputs indicating an interaction with the software application's user interface;
during operation of the software application, detecting that a first visual trigger indicating a first interaction with the software application's user interface corresponding to a first set of user-defined property values has been triggered;
applying the first set of user-defined property values of the one or more style resources to the one or more user interface objects such that corresponding default property values for the style resources are overridden by the restored first set of user-defined property values;
generating a first visual representation of the one or more user interface elements with the applied first set of user-defined property values of the one or more style resources;
rendering a display representation of the generated first visual representation for presentation on a user interface display;
during operation of the software application, detecting that a second visual trigger indicating a second, different interaction with the software application's user interface corresponding to a second set of user-defined property values has been triggered;

applying the second set of user-defined property values of the one or more style resources to the one or more user interface objects such that the first set of user-defined property values for the style resources is overridden by the restored second set of user-defined property values;

during operation of the software application, dynamically modifying the first visual representation of the one or more user interface elements with the applied second set of user-defined property values of the one or more style resources, such that a second, different visual representation is generated;

rendering a display representation of the generated second visual representation for presentation on the user interface display;

during operation of the software program, detecting that at least one of the user inputs indicating an interaction with the software application's user interface that triggered the second visual trigger corresponding to the second set of user-defined property values is no longer triggering the second visual trigger;

automatically restoring the first set of user-defined property values such that the second set of user-defined property values for the style resources is overridden by the restored first set of user-defined property values;

during operation of the software application, dynamically modifying the second visual representation of the one or more user interface elements with the restored first set of user-defined property values of the one or more style resources, such that a third, different visual representation is generated; and rendering a display representation of the generated third visual representation for presentation on the user interface display.

* * * * *